US008667307B2

(12) United States Patent
Chiu

(10) Patent No.: US 8,667,307 B2
(45) Date of Patent: Mar. 4, 2014

(54) POWER CONTROL CIRCUIT AND METHOD OF COMPUTER SYSTEM

(75) Inventor: Yi-Wen Chiu, Taipei (TW)

(73) Assignee: ASUSTeK Computer Inc., Taipei (TW)

(*) Notice: Subject to any disclaimer, the term of this patent is extended or adjusted under 35 U.S.C. 154(b) by 529 days.

(21) Appl. No.: 12/775,787

(22) Filed: May 7, 2010

(65) Prior Publication Data

US 2010/0293396 A1 Nov. 18, 2010

(30) Foreign Application Priority Data

May 15, 2009 (TW) ................................ 98116228 A

(51) Int. Cl.
*G06F 1/26* (2006.01)
*G06F 1/32* (2006.01)

(52) U.S. Cl.
USPC ............. 713/300; 713/320; 713/323; 714/14; 714/100

(58) Field of Classification Search
USPC ................... 713/300, 320, 323; 714/14, 100
See application file for complete search history.

(56) References Cited

U.S. PATENT DOCUMENTS 6,775,784 B1 * 8/2004 Park .............................. 713/320
7,444,527 B2 10/2008 Wu

FOREIGN PATENT DOCUMENTS

CN 101043144 A 9/2007

* cited by examiner

*Primary Examiner* — Kim Huynh
*Assistant Examiner* — Michael J Brown
(74) *Attorney, Agent, or Firm* — Jianq Chyun IP Office

(57) ABSTRACT

A power control circuit and a power control method applied to a computer system are disclosed. A regulator receives a first voltage, the regulator converting the first voltage to an embedded controller voltage when the regulator is enabled. A detecting and controlling circuit receives the first voltage and the button signal, and the regulator is enabled when the detecting and controlling circuit detects the button signal. An embedded controller connects to the regulator for receiving the embedded controller voltage and outputting the plurality of power control signals. The embedded controller sends a power on signal to the detecting and controlling circuit to keep the regulator enabled.

7 Claims, 2 Drawing Sheets

POWER CONTROL CIRCUIT AND METHOD OF COMPUTER SYSTEM

FIELD OF THE INVENTION

The invention relates to a power control circuit and method of a computer system and, more particularly, to a power control circuit and method of an embedded controller of a computer system.

BACKGROUND OF THE INVENTION

A computer system like a notebook has an embedded controller (EC) for controlling a power management of computer system, a battery charging operation, and a rotation rate of the fan. The power management includes the power control in operating in a power on status and a power off status.

Because the power management is controlled by the embedded controller, the embedded controller must be kept in an alive status in the computer. Therefore, even the computer jumps to a sleep status or a power off status, the embedded controller is still keeping in an alive status. Hence, the power of the embedded controller is provided by a standby power, the standby power is provided by a battery in the computer.

FIG. 1 is a diagram showing a power control circuit and method of an embedded controller in a traditional computer system. The battery voltage (Vbat) of the battery is provided to a regulator 10, and the regulator 10 sends an embedded controller voltage (VEC) to the embedded controller 20. The embedded controller voltage (VEC) is the standby power and it's about 3V.

The regulator 10 had an enable pin (EN). A first resistance (R1) connects the battery voltage (Vbat) and the enabled pin (EN). When the battery is installed into the computer, the enable pin (EN) is in the high level voltage and makes the regulator 10 operate, and the regulator 10 provides an embedded controller voltage (VEC) to the embedded controller 20. After the embedded controller 20 receives the embedded controller voltage (VEC), the embedded controller 20 will output a power on signal (PW_ON) in a high level voltage.

A traditional embedded controller 20 connects to a power button in the computer system for receiving a button signal. If the power button is not pressed, the button signal keeps in a high level voltage. On the contrary, when the user presses the power button, the button signal keeps in a low level voltage, and the period of the pressing time is the term that keeps in the low level voltage. When the embedded controller 20 detects that the button signal is in the low level voltage, the embedded controller 20 will send a plurality of power control signals to wake up the other device and operate in the computer.

However, when the battery is installed into the computer, the regulator 10 and the embedded controller 20 will continuously consume the energy of the battery. Generally, the quiescent current is about 3~5 ma, if the battery is installed into the computer product for a long shelf time, the user may not power on the computer by the remaining energy of the battery after purchasing.

SUMMARY OF THE INVENTION

The invention discloses a power control circuit and method of a computer system for reducing the quiescent current, so the energy of the battery kept a long time in the computer system.

The invention provides a power control circuit of a computer system. The power control circuit comprising: a regulator for receiving a first voltage, the regulator converting the first voltage to an embedded controller voltage when the regulator is enabled; a detecting and controlling circuit for receiving the first voltage and the button signal, and the regulator is enabled when the detecting and controlling circuit detecting the button signal; and an embedded controller connected to the regulator for receiving the embedded controller voltage and outputting the plurality of power control signals; wherein the embedded controller sending a power on signal to the detecting and controlling circuit to keep the regulator enabled.

Another aspect of the invention further provides a power control method, adapting to a computer, the computer comprising a regulator, a detecting and controlling circuit, and an embedded controller. The method including: detecting a button signal; disabling the regulator to stop the regulator and the embedded controller operating when the button signal is not provided; and enabling the regulator to provide an embedded controller voltage to the embedded controller.

BRIEF DESCRIPTION OF THE DRAWINGS

These and other features, aspects and advantages of the present invention will become better understood with regard to the following description, appended claims, and accompanying drawings.

DETAILED DESCRIPTION OF THE PREFERRED EMBODIMENT

Figure 1:
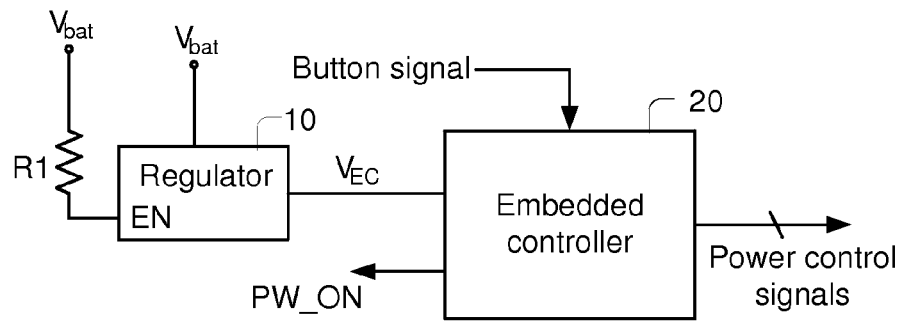
FIG. 1 is a diagram showing a power control circuit of an embedded controller of a traditional computer system.
Figure 2:
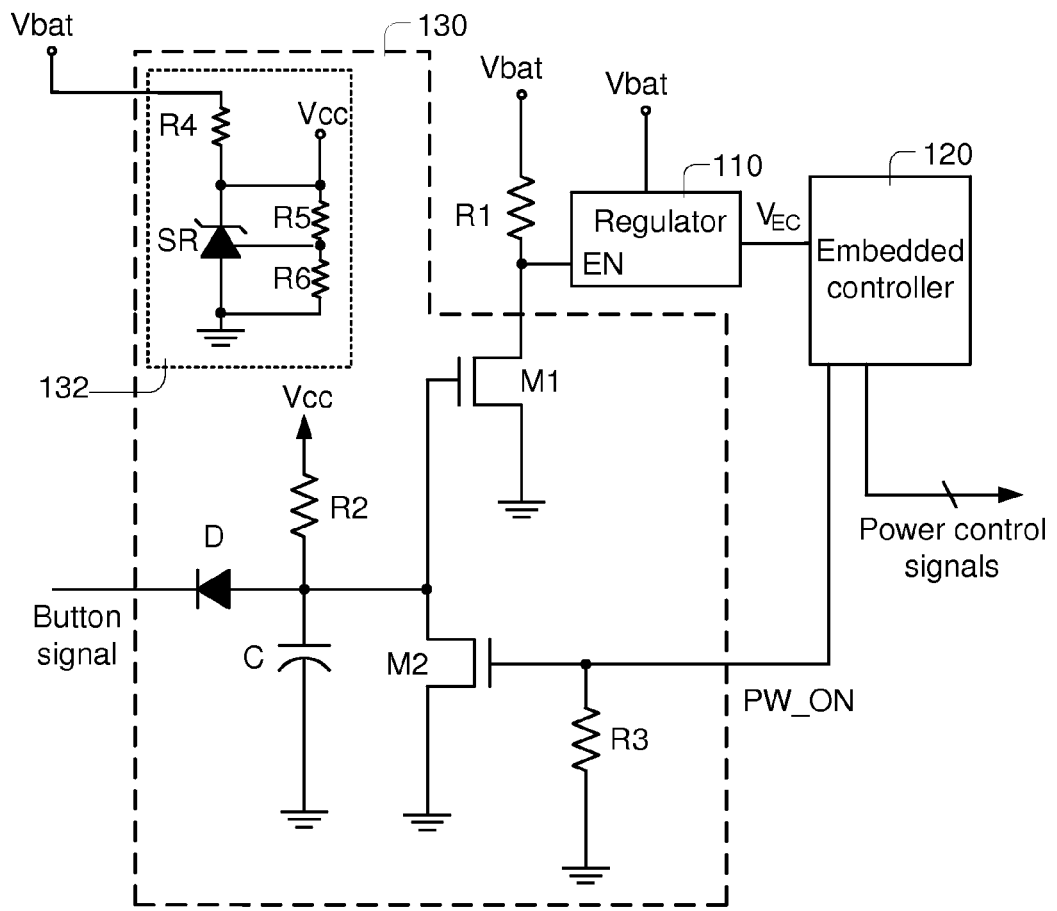
FIG. 2 is a schematic diagram showing a power control circuit in a first embodiment of the invention.

Please refer to FIG. 2. FIG. 2 is a schematic diagram showing a power control circuit in a first embodiment of the invention. The power control circuit includes a detecting and controlling circuit 130, a regulator 110, and an embedded controller 120. In the first embodiment of the invention, the regulator 110 and the embedded controller 120 do not operate when the battery installs into the computer. When the user presses the power button and keeps the button signal in a low level voltage, the detecting and controlling circuit 130 controls the regulator 110 to output an embedded controller voltage (VEC) to the embedded controller 120. And the embedded controller 120 outputs a plurality of power control signals to wake up the operation of the other device of a computer system.

In the FIG. 2, a battery voltage (Vbat) from a battery is provided to the regulator 110. A first resistance (R1) connects the battery voltage (Vbat) and an enabled pin (EN) of the regulator 110. The regulator 110 outputs the embedded controller voltage (VEC) to the embedded controller 120 when the regulator 110 is enabled. When the embedded controller 120 receives the embedded controller voltage (VEC), the embedded controller 120 outputs a power on signal (PW_ON) in a high level voltage and a plurality of power control signals simultaneously to wake up the operation of the other device of a computer system.

The detecting and controlling circuit 130 further comprises a regulated circuit 132, a first transistor (M1), a second transistor (M2), a second resistance (R2), a third resistance (R3), a capacitance (C), and a diode (D). The regulated circuit 132 comprises a parallel connection regulator (for example: shunt regulator (SR)), a fourth resistance (R4), a fifth resistance (R5), a sixth resistance (R6). The fourth resistance (R4) connects the battery voltage (Vbat) and the cathode of the SR. An anode of the SR connects to the ground. The fifth resistance (R5) connects the cathode of the SR and a reference pin of the SR. The sixth resistance (R6) connects the anode of the SR and the reference pin of the SR. Therefore, the regulated circuit 132 converts the battery voltage (Vbat) to an operated voltage (Vcc).

The drain of the first transistor (M1) connects to the enabled pin (EN), and the source of the first transistor (M1) connects to the ground. The drain of the second transistor (M2) connects to the gate of the first transistor (M1), and the source of the second transistor (M2) connects to the ground. The third resistance (R3) connects the gate of the second transistor (M2) and the ground. The gate of the second transistor (M2) receives the power on signal (PW_ON). The cathode of the diode (D) receives the button signal, and an anode of the diode (D) connects to the gate of the first transistor (M1). The second resistance (R2) connects the gate of the first transistor (M1) and the operated voltage (Vcc). The capacitance (C) connects the gate of the first transistor (M1) and the ground.

When the user does not press the power button, the button signal keeps in the high level voltage. Due to the gate of the first transistor (M1) is in the high level voltage, the first transistor (M1) turns on, and the enable pin (EN) is thus kept in the low level voltage. Therefore, the regulator 110 cannot operate and the embedded controller 120 cannot receive the embedded controller voltage (VEC) from the regulator 110.

When the user presses the power button, the button signal is changed to the low level voltage. Due to the gate of the first transistor (M1) is kept in the low level voltage, the first transistor (M1) turns off, and the enable pin (EN) changes to the high level voltage. Therefore, the regulator 110 starts to be operated and then outputs the embedded controller voltage (VEC) to the embedded controller 120. Hence, the embedded controller 120 outputs simultaneously a power on signal (PW_ON) in the high level voltage and a plurality of power control signals to wake up the operation of the other devices of a computer system. Furthermore, when the gate of the second transistor (M2) receives the power on signal (PW_ON) in the high level voltage, the second transistor (M2) turns on and keeps the gate of the first transistor (M1) in the low level voltage. At this time, the gate of the first transistor (M1) still keeps in the low level voltage even when the button signal goes back to the high level voltage.

According to the first embodiment of the invention, only the detecting and controlling circuit 130 but not the regulator 110 nor the embedded controller 120 operates when the battery is installed in the computer. Moreover, the standby current of the detecting and controlling circuit 130 of the present invention reduces to 300~500 µA, so the capacity of battery will keep a longer time.

After the user presses the power button, the detecting and controlling circuit 130 controls the regulator 110, and outputs the embedded controller voltage (VEC) to the embedded controller 120. Thus, the embedded controller 120 outputs a plurality of power control signals to wake up the operation of the other device of a computer system.

Figure 3:
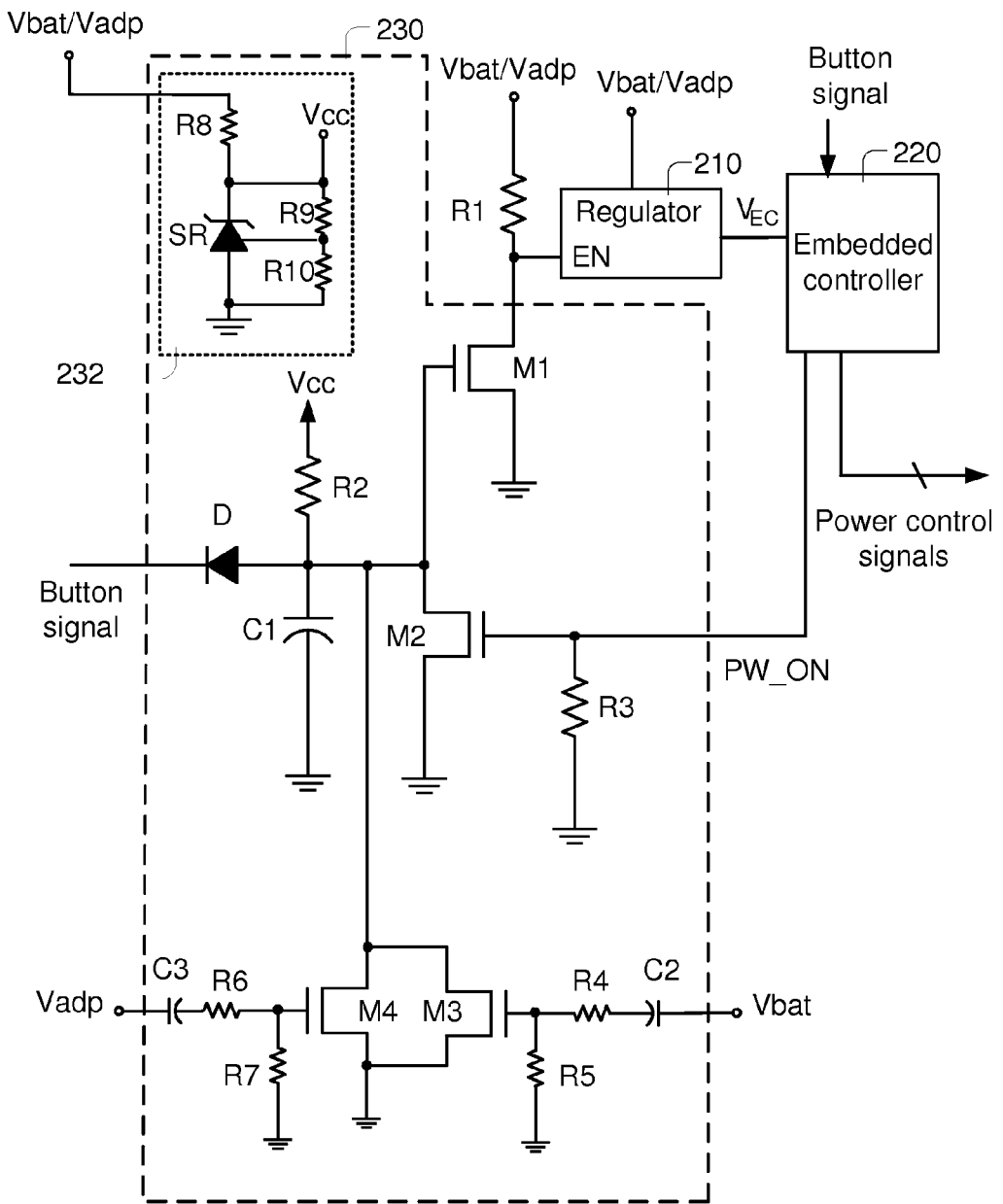
FIG. 3 is schematic diagram showing a power control circuit in a second embodiment of the invention.

Please refer to FIG. 3. FIG. 3 is a schematic diagram showing a power control circuit of a second embodiment of the invention. The power control circuit includes a detecting and controlling circuit 230, a regulator 210, and an embedded controller 220. In the second embodiment of the invention, the regulator 210 and the embedded controller 220 are not operated even when the battery is installed to the computer. The embedded controller 220 is operated before the button signal is confirmed in the second embodiment of the invention. The detecting and controlling circuit 230 controls the regulator 210 to output an embedded controller voltage (VEC) to the embedded controller 220 when the user presses the power button and keeps the button signal in a low level voltage. And the embedded controller 220 outputs a plurality of power control signals to wake up the operation of the other device of the computer system.

In the FIG. 3, a battery voltage from a battery or an adapter voltage from an adapter is provided to the regulator 210. The regulator 210 has an enabled pin (EN), and a first resistance (R1) connects the battery voltage/the adapter voltage (Vbat/Vadp) and the enabled pin (EN). The regulator 210 outputs an embedded controller voltage (VEC) to the embedded controller 220 when the regulator 210 is enabled. When the embedded controller 220 receives the embedded controller voltage (VEC), the embedded controller 220 has to check the button signal first. That is to say, the power on signal (PW_ON) keeps in a low level voltage when the button signal is in a high level voltage. On the contrary, the power on signal (PW_ON) keeps in a high level voltage when the button signal is in a low level voltage, and thus a plurality of power control signals is outputted to wake up the operation of the other device of the computer system.

The detecting and controlling circuit 230 further comprises: a regulated circuit 232, a first transistor (M1), a second transistor (M2), a third transistor (M3), a fourth transistor (M4), a second resistance (R2), a third resistance (R3), a fourth resistance (R4) a fifth resistance (R5), a sixth resistance (R6) a seventh resistance (R7), a first capacitance (C1), a second capacitance (C2), a third capacitance (C3), and a diode (D). The regulated circuit 232 further comprises a parallel connection regulator (for example: a shunt regulator (SR)), an eight resistance (R8), a ninth resistance (R9), and a tenth resistance (R10). The eighth resistance (R8) connects the battery voltage/adapter voltage (Vbat/Vadp) and the cathode of the SR. An anode of the SR connects to the ground. The ninth resistance (R9) connects the cathode of the SR and a reference pin of the SR. The tenth resistance (R10) connects the anode of the SR and the reference pin of the SR. The regulated circuit 232 converts the battery voltage/adapter voltage (Vbat/Vadp) to an operated voltage (Vcc).

The drain of the first transistor (M1) connects to the enabled pin (EN), and the source of the first transistor (M1) connects to a ground. The drain of the second transistor (M2) connects to the gate of the first transistor (M1), and the source of the second transistor (M2) connects to the ground. The third resistance (R3) connects the gate of the second transistor (M2) and the ground. The gate of the second transistor (M2) receives the power on signal (PW_ON). The cathode of the diode (D) receives the button signal, and an anode of the diode (D) connects to the gate of the first transistor (M1). The second resistance (R2) connects the gate of the first transistor (M1) and the operated voltage (Vcc). The first capacitance (C1) connects the gate of the first transistor (M1) and ground.

The drain of the third transistor (M3) connects to the gate of the first transistor (M1), and the source of the third transistor (M3) connects to the ground. The fifth resistance (R5) connects the gate of the third transistor (M3) and the ground. The first terminal of the second capacitance (C2) receives the battery voltage (Vbat). The fourth resistance (R4) connects a second terminal of the second capacitance (C2) and the gate of the third transistor (M3). The drain of the fourth transistor (M4) connects to the gate of the first transistor (M1), and the source of the fourth transistor (M4) connects to the ground. The seventh resistance (R7) connects the gate of the fourth transistor (R4) and the ground. The first terminal of the third capacitance (C3) receives the adapter voltage (Vadp). The sixth resistance connects a second terminal of the third capacitance (C3) and the gate of the fourth transistor (M4).

When the user does not press the power button and the battery installs into the computer, regulator 210, the first resistance (R1), and the regulated circuit 232 receive the battery voltage (Vbat). The third transistor (M3) turns on, the gate of first transistor (M1) keeps in the low level voltage and the first transistor (M1) turns off. Because the first transistor (M1) turns off, the enable pin (EN) keeps in the high level voltage. Due to enable pin (EN) keeps in the high level voltage, the regulator 210 operates and the embedded controller 220 receives the embedded controller voltage (VEC) from the regulator 210. The button signal is high level voltage, so the power on signal (PW_ON) keeps in a low level voltage. After the change circuit including the fourth resistance (R4), the fifth resistance (R5), and the second capacitance (C2) changes a period, the third transistor (M3) turns off. Due to the third transistor (M3) turns off, the gate of the first transistor (M1) keep in a high level voltage and the first transistor (M1) turns on. Because the first transistor (M1) turns on, the enable pin keep in a low level voltage. The regulator 210 and the embedded controller 220 restore to no operated status.

When the user does not press the power button and the adapter installs into the computer, the regulator 210, the first resistance (R1), and the regulated circuit 232 receive the adapter voltage (Vadp). The fourth transistor (M4) turn on, so the gate of first transistor (M1) keeps in the low level voltage and the first transistor (M1) turns off. Because the first transistor (M1) turns off, the enable pin (EN) keep in the high level voltage. Due to enable pin (EN) keep in the high level voltage, the regulator 210 operates and the embedded controller 220 receives the embedded controller voltage (VEC) from the regulator 210. The button signal is high level voltage, so the power on signal (PW_ON) keeps in a low level voltage. After the change circuit including the seventh resistance (R7), the sixth resistance (R6), and the third capacitance (C3) changes a period, the fourth transistor (M4) turns off. Due to the fourth transistor (M4) turns off, the gate of the first transistor (M1) keeps in a high level voltage and the first transistor (M1) turns on. Because the first transistor (M1) turns on, the enable pin keeps in a low level voltage. The regulator 210 and the embedded controller 220 restore to no operated status.

When the user presses the power button and the battery or the adapter installs into the computer, the button signal keeps in a low level voltage. Dou to the gate of first transistor (M1) keeps in the low level voltage, the first transistor (M1) turns off. Because the first transistor (M1) turns off, the enable pin (EN) keeps in the high level voltage. Due to enable pin (EN) keeps in the high level voltage, the regulator 210 operates and the embedded controller 220 receives the embedded controller voltage (VEC) from the regulator 210. The button signal is low level voltage, so the power on signal (PW_ON) from the embedded controller 220 keeps in a high level voltage. The embedded controller 220 outputs a power on signal (PW_ON) in the high level voltage and the plurality of power control signals to wake up the operation of the other device of a computer system. When the gate of the second transistor (M2) receives the power on signal (PW_ON) in the high level voltage, the second transistor (M2) turns on. Because the second transistor (M2) turns on, the gate of the first transistor (M1) keeps in the low level voltage. When the button signal restores the high level voltage, the gate of the first transistor (M1) still keeps in the low level voltage.

When the battery or the adapter installs into the computer in the second embodiment of the invention, the regulator 210 and the embedded controller 220 operate in a short time. If the user does not press the power button in the short time, the regulator 210 and the embedded controller 220 restore no operation. If the user presses the power button in the short time, the regulator 210 and the embedded controller 220 operate continuously.

The standby current of the detecting and controlling circuit 230 in the invention reduces to 300~500 μA, so the capacity of battery keeps longer time.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power control circuit of a computer system, the power control circuit comprising:
    a regulator for receiving a first voltage, the regulator converting the first voltage to an embedded controller voltage when the regulator is enabled, wherein the regulator comprises a first resistance;
    a detecting and controlling circuit for receiving the first voltage and a button signal, and the regulator is enabled when the detecting and controlling circuit detecting the button signal, and the detecting and controlling circuit comprising:
    a second resistance;
    a third resistance; and
    a regulated circuit for converting the first voltage to an operated voltage, wherein the regulated circuit comprises:
        a parallel connection regulator, an anode of the parallel connection regulator connected to the ground, and a cathode of the parallel connection regulator outputting the operated voltage;
        a fourth resistance connecting the first voltage and the cathode of the parallel connection regulator;
        a fifth resistance connecting the cathode of the parallel connection regulator and a reference pin of the parallel connection regulator; and
        a sixth resistance connecting the anode of the parallel connection regulator and the reference pin of the parallel connection regulator; and
    an embedded controller connected to the regulator for receiving the embedded controller voltage and outputting the plurality of power control signals;
    wherein the embedded controller sending a power on signal to the detecting and controlling circuit to keep the regulator enabled.

2. The power control circuit according to claim 1, wherein the first voltage is a battery voltage provided by a battery or an adapter voltage provided by an adapter, and the detecting and controlling circuit receives the first voltage and the button signal and disables the regulator when the button signal is not provided to the detecting and controlling circuit.

3. The power control circuit according to claim 1, wherein the regulator comprises an enabled pin connected to the detecting and controlling circuit, and the first resistance connects the first voltage and the enabled pin.

4. The power control circuit according to claim 3, wherein the detecting and controlling circuit further comprising:
    a first transistor, the drain of the first transistor connected to the enabled pin, and the source of the first transistor connected to the ground; the second resistance connecting a gate of the first transistor and the operated voltage;
    a second transistor, a drain of the second transistor connected to the gate of the first transistor, and a source of the second transistor connected to the ground, and a gate of the second transistor received the power on signal;

the third resistance connecting the gate of the second transistor and the ground;

a diode, a cathode of the diode received the button signal, and an anode of the diode connect to the gate of the first transistor; and a capacitance connecting the gate of the first transistor and the ground.

5. The power control circuit according to claim 3, wherein the detecting and controlling circuit further comprising:

a first transistor, the drain of the first transistor connecting to the enabled pin, and the source of the first transistor connected to the ground;

the second resistance connecting a gate of the first transistor and the operated voltage;

a second transistor, a drain of the second transistor connecting to the gate of the first transistor, and a source of the second transistor connecting to the ground, and a gate of the second transistor receiving the power on signal;

the third resistance connecting the gate of the second transistor and the ground;

a diode, a cathode of the diode receiving the button signal, and an anode of the diode connecting to the gate of the first transistor; and a first capacitance connecting to the gate of the first transistor and the ground;

a third transistor, the drain of the third transistor connecting to the gate of the first transistor, and the source of the third transistor connecting to the ground;

a second capacitance, a first terminal of the second capacitance received the first voltage;

a fourth resistance connecting a second terminal of the second capacitance and the gate of the third transistor; and a fifth resistance connecting the gate of the third transistor and the ground.

6. The power control circuit according to claim 5, wherein the detecting and controlling circuit further comprising:

a fourth transistor, a drain of the fourth transistor connecting to the gate of the first transistor, and a source of the fourth transistor connecting to the ground;

a third capacitance, a first terminal of the third capacitance received a second voltage;

a sixth resistance connecting a second terminal of the third capacitance and a gate of the fourth transistor; and a seventh resistance connecting the gate of the fourth transistor and the ground.

7. The power control circuit according to claim 5, wherein the regulated circuit comprising:

the parallel connection regulator, an anode of the parallel connection regulator connecting to the ground, and a cathode of the parallel connection regulator outputting the operated voltage;

an eighth resistance connecting the first voltage and the cathode of the parallel connection regulator;

a ninth resistance connecting the cathode of the parallel connection regulator and a reference pin of the parallel connection regulator; and a tenth resistance connecting the anode of the parallel connection regulator and the reference pin of the parallel connection regulator.

* * * * *